April 19, 1960   W. WINZENBURG   2,933,026
MICROFILM CAMERA DETACHABLY CONNECTED WITH A FIELD GLASS
Filed Jan. 2, 1958

INVENTOR.
Wilhelm Winzenburg

United States Patent Office 2,933,026
Patented Apr. 19, 1960

2,933,026

MICROFILM CAMERA DETACHABLY CONNECTED WITH A FIELD GLASS

Wilhelm Winzenburg, Dresden, Germany, assignor to VEB Kamera- und Kinowerke Dresden Application January 2, 1958, Serial No. 706,701

Claims priority, application Germany January 17, 1957

7 Claims. (Cl. 95—12)

This invention relates to a microfilm camera of convenient size particularly intended for detachable connection with a field glass, sharp focussing of both the field glass and the taking lens of the camera being jointly effected by means of a coupling rod. The coupling means according to the invention permit also detachable connection of a camera using substandard film.

The known arrangements for combining a camera and a field glass to form a structural unit require sepecial design and construction of the field glass, and some cameras have become known which are firmly connected to the field glass.

It is the object of the invention to propose selective connection and disconnection of cameras and standard field glasses without the use of tools. For this purpose a connecting member readily removable from the camera is attached to the central shaft of the field glass and, for focussing, the telephoto taking lens or a member thereof is joined to the eyepiece drive of the field glass by a detachable coupling rod either directly and/or by a motion compensating member having for instance the form of a cam.

At its bottom surface the connecting member is fitted with an easily detachable adapter, for instance a foot or base for the camera, from which the latter is detached when used without a field glass. The connecting piece or shoe provided on the camera serve also in known manner for attaching finders or other photographic accessories.

One end of the coupling rod is connected in a particularly advantageous manner to the telephoto taking lens by means of a coupling device, and the other end, which has a forklike shape, engages the movable eyepiece of the field glass.

According to another feature of the invention, a release lever for the shutter is articulated to the detachable connecting member; it lies above the body of the field glass and is correctly anatomically adapted to the releasing finger. This arrangement is of special importance, since, owing to the necessarily long focal length of the lens of about 8 cm., release must be free from vibration. Should the release be disposed in an anatomically unfavorable position, the image would be blurred.

The operating elements for film winding, exposure setting, etc. are clearly arranged on the side of the telescopic eyepiece with the result that the shape of the camera is well adapted to the field glass. An elevation formed on the camera and accommodating a focal plane shutter of the cylinder type is placed between the two bodies of the field glass. This is attained by arranging the film and film spools as well as the shutter axes parallel to the optical axis of the lens, and the rays coming from the object to be taken are deflected by an optical member, for instance a mirror or prism. The focal plane shutter of the cylinder type can be directly set by its shaft extending to the side of the telescopic eyepiece. As the optical axis of the lens is suitably bent downwardly and the shutter is of the cylinder type, the shaft of the shutter can be horizontally disposed and directly led to the side of the telescopic eyepiece for time and shutter setting. The film-speed and the shutter setter are coupled in a particularly satisfactory manner which is known per se. The shaft led to the side of the telescopic eyepiece is provided with a suitable handle and acts as high speed shutter setter.

For storing film either the bottom side of the camera fitted with a hinge or the like can be opened or a film changing magazine filled with black and white or color film and having the necessary locking means and a handle may be readily attached to the camera.

Two embodiments of the invention are shown in the accompanying drawings, wherein.

Figure 2:
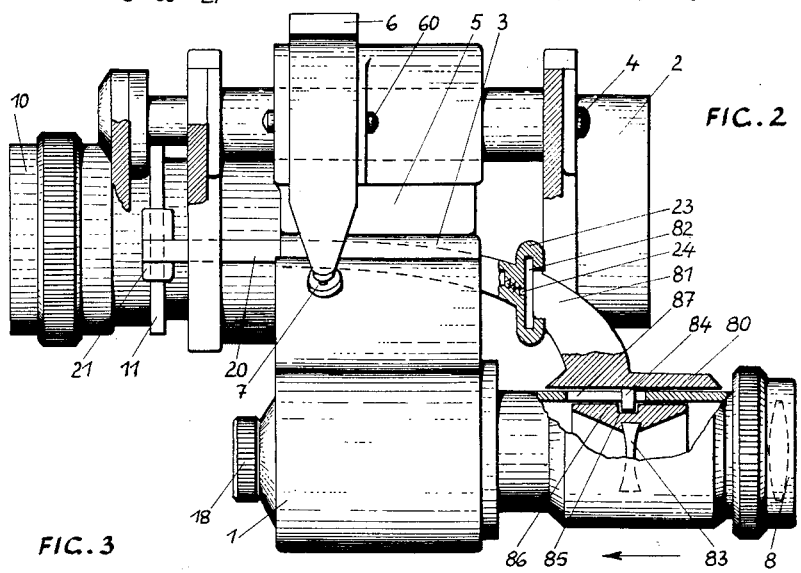
Fig. 2 is a side view, partly in section, of the camera and field glass.

The microfilm camera 1 is disposed below the field glass 2 and attached by known holding means 3 to a connecting member 5 secured to the central shaft 4 of the field glass 2, the arrangement being such that the connecting member 5 can be detached from the central shaft 4 without the least difficulty. To the connecting member 5 a release lever 6 positioned above the field glass 2 is articulated by a pin 60 and acts upon a release knob 7 provided on the camera body 1. The telephoto taking lens 8 can be exchanged for lenses of different focal length and, as indicated in Fig. 2, is joined to the eyepiece 10 by a coupling rod 20. The forked left-hand end 21 of the coupling rod 20 engages an annular lug 11 of the eyepiece 10. The right-hand end of the coupling rod 20 has a coupling device 23 for establishing connection with the interchangeable telephoto taking lens 8. The coupling device 23 is engaged by an arm 81 of a telephoto lens ring 80; the arm 81 has two noses 82 and is firmly connected to the coupling rod 20 by a resilient ball catch 24. To exchange the telephoto lens for another one, it is only necessary to turn the lens relative to the camera casing and coupling rod.

At sharp focussing of the field glass for viewing an object the eyepiece is shifted as known. When a field glass is to be connected with a taking camera in such manner that adjustment of the eyepiece involves simultaneous adjustment of the taking lens, certain optical conditions existing between the field glass lens and the photographic taking lens have to be observed and met. With respect to sharp focussing of the field glass for the object to be viewed and sharp focussing of the telephoto taking lens for the image and film plane in the camera Fig. 2 shows that the longitudinal displacement for all distances to be focussed by eyepiece 10 of the field glass and the back member 83 of the telephoto taking lens 8 is invariable. If the focussing paths differ in length between the eyepiece of the field glass and the telephoto taking lens due to different types of lenses, a compensating gear as shown in Fig. 3 is required.

The mode of operation of a field glass in connection with the telephoto lens of a microfilm camera is as follows and shown in Fig. 2:

When the eyepiece 10 of the field glass is shifted, the entire eyepiece including the annular lug 11 is displaced to the left. An object to be viewed by the field glass at close range will be sharply shown on the image plane in the field glass, and the coupling rod 20 connected with the annular lug 11 is displaced also. As the rod 20 is connected to the lens arm 81, the lens ring 80 is displaced in the same direction as shown by the arrow. Inside the lens ring 80 a pin 84 is provided which projects into a hole 85 of the mounting part 86 in which the back lens 83 is arranged. The mount of the telephoto taking lens 8 has a longitudinal slot 87 so that at adjustment of the eyepiece 10 the lens ring 80 with the pin 84 and the mounting part 86 can be displaced in the direction of the optical taking axis.

Figure 3:
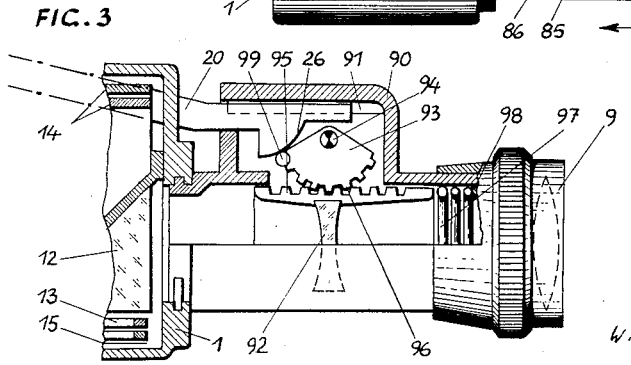
Fig. 3 is a side view, partly in section, of the telephoto taking lens connected with the camera and a compensating gear, the field glass being omitted.

Owing to the different operating methods of the eyepiece of the field glass and the telephoto taking lens, the example shown in Fig. 3 is somewhat different. The camera casing 1 is here fitted with a telephoto taking lens 9 the focussing path of which differs from that of the eyepiece 10 of the field glass. For compensating this difference serves a cam 26 on the coupling rod 20. The outer mounting part 90 of the telephoto lens 9 has guide rails 91 between which the right-hand end of the coupling rod 20 is guided. For sharp focussing of the object on the image or film plane 15 in the camera the back member 92 of the telephoto taking lens is displaced in the same way as in the example shown in Figs. 1 and 2. For transmitting motion from the coupling rod 20 to the back member 92 a tooth segment 93 is swingingly positioned on a pin 94. The teeth of the segment 93 engage a toothing 96 on the inner mounting part 95 of the back member 92. To ensure constant connection between the cam 26 and the inner mounting part 95 and to avoid lost motion, a spring 97 supported by a surface 98 within the inner mounting part 95 presses against this inner mounting part 95 so that the guide roller 99 secured to the tooth segment 93 constantly abuts on the cam 26.

The setting of the eyepiece of the field glass, which is performed in the usual way, causes also an adjustment of the inner mounting part 95 including the back member 92. Depending on the rise of the cam 26, the back member 92 is more or less displaced relative to the displacement of the eyepiece.

Figure 1:
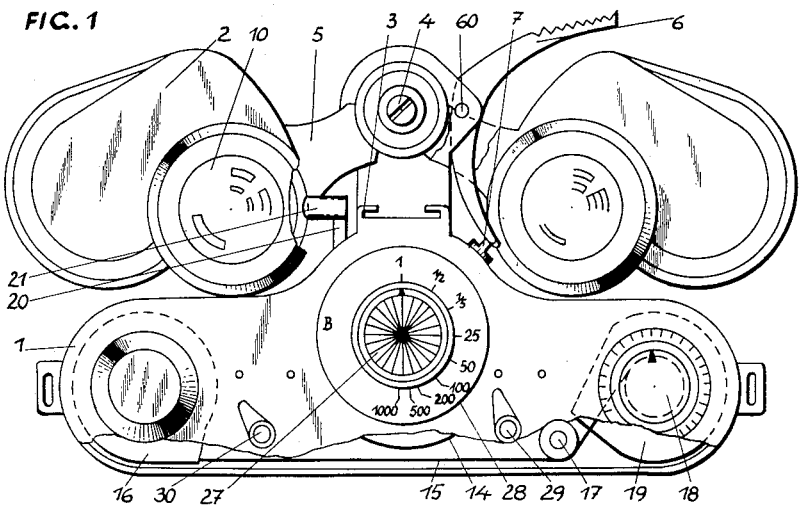
Figure 1 is a view of the field glass connected with the camera and seen from the side of the eyepiece.

In the construction according to Fig. 3 the light rays passing from the object into the telephoto taking lens are deflected by a prism 12 and through the window-like openings 13 of the cylindrical sleeves 14 reach the film strip 15. As indicated in Fig. 1, the film strip 15 is wound out of the reservoir 16 and by way of the roll 17 wound into the film-receiving magazine 19 by means of the film transport and shutter setting knob 18. On the side of the camera housing 1 averted from the taking lens 8 or 9, which is the side of the telescopic eyepiece, the exposure setting knob 27 is located and can be adjusted according to an exposure scale 28. The lever 29 serves for setting long exposures, which is brought about by means of a brake device of known type controlling the shutter. The lever 30 starts and stops the exposure time regulated by the shutter.

When taken off from the field glass, the camera may be applied to numerous purposes by providing it with a finder, range finder, exposure meter or the like, and by changing the taking lens and the film magazine.

I claim:

1. A field glass and camera combination comprising a binocular, means for focusing said binocular, including a central pivot, a camera depending from said central pivot, means detachably securing said camera to said binocular, axially movable camera focus means having a geared rack disposed within said camera, a coupling rod engaged with said means for focusing said binocular and having cam surface, and a geared segment pivotally mounted within said camera engaging said geared rack and said cam surface.

2. A field glass and camera combination as set forth in claim 1, further comprising a camera shutter release and a shutter release lever mounted on said binocular having an actuating arm disposed superior to said binocular.

3. A field glass and camera combination comprising a binocular, including an objective portion and a telescoping focusing portion movable with respect to said objective portion, means for adjusting the position of said focusing portion, a camera detachably depending from said binocular including a shutter, camera focusing means having an axially movable lens support with a geared rack, a connector element secured to said focusing portion of said binocular, a coupling rod movable with said connector element disposed longitudinal with said binocular, said coupling rod having a cam surface end, a gear segment pivotally mounted in said camera engaging said geared rack and said cam surface, and a shutter release lever pivotally mounted on said objective portion of said binocular having an actuating arm disposed superior to said binocular.

4. A field glass and camera combination as set forth in claim 3, further comprising resilient means within said camera abutting said geared rack for biasing said gear segment against said cam surface.

5. A camera and binocular combination comprising: a pair of parallel field glasses, a central pivot parallel to said field glasses adjustably supporting said glasses; a connector member secured to said central pivot and depending from said pivot between said field glasses, a camera detachably secured to said connector member and depending therefrom, a shutter release on said camera, a rocker arm pivotally mounted on said connector member having one end extending downwardly and engageable with said shutter release and the other end extending upwardly to a position superior to one of said field glasses.

6. A camera and binocular combination as set forth in claim 5, wherein said field glasses include an ocular portion and an objective portion, and wherein said camera comprises a lens having an optical axis parallel to the optical axes of said field glasses and positioned on the side of said camera associated with said objective portion, a shutter timing control on said camera positioned on the side of said camera opposite said lens and associated with said ocular portion; and a film wind on said camera positioned on the side of said camera associated with the ocular portion of said field glasses.

7. A camera for attachment to the pivot of a binocular comprising a housing, detachable means on said housing for connection with the central pivot of the binocular, said housing including a forward wall and a rear wall, an objective lens mounted on the forward wall of said housing, a film advance knob mounted on the rear wall of said housing, a shutter speed control mounted on the rear wall of said housing, a shutter release on the upper wall of said housing, and a rocker arm pivotally mounted on said means for securing said camera to said binocular center shaft having one end engageable with said camera shutter and another end extending away from the upper wall of said camera.

References Cited in the file of this patent

FOREIGN PATENTS

| | | |
|---|---|---|
| 513,828 | Great Britain | Jan. 6, 1938 |
| 956,524 | France | Aug. 8, 1949 |